(12) United States Patent
Zavesky et al.

(10) Patent No.: US 10,135,920 B2
(45) Date of Patent: *Nov. 20, 2018

(54) OPPORTUNISTIC CROWD-BASED SERVICE PLATFORM

(71) Applicant: AT&T Intellectual Property I, L.P., Atlanta, GA (US)

(72) Inventors: Eric Zavesky, Austin, TX (US); Andrea Basso, Turin (IT); Lee Begeja, Gillette, NJ (US); David C. Gibbon, Lincroft, NJ (US); Zhu Liu, Marlboro, NJ (US); Bernard S. Renger, New Providence, NJ (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/860,210

(22) Filed: Jan. 2, 2018

(65) Prior Publication Data

US 2018/0124166 A1 May 3, 2018

Related U.S. Application Data

(63) Continuation of application No. 15/403,682, filed on Jan. 11, 2017, now Pat. No. 9,882,978, which is a (Continued)

(51) Int. Cl.
*H04L 29/08* (2006.01)
*H04W 4/70* (2018.01)
(Continued)

(52) U.S. Cl.
CPC .......... *H04L 67/104* (2013.01); *G06Q 10/00* (2013.01); *G06Q 30/0261* (2013.01); (Continued)

(58) Field of Classification Search
CPC ......... H04W 4/02; H04W 64/00; H04W 4/04; H04W 4/24; H04W 24/08; H04W 12/06; (Continued)

(56) References Cited

U.S. PATENT DOCUMENTS 8,079,061 B2 12/2011 Taniguchi et al.
8,121,618 B2 2/2012 Rhoads et al.
(Continued)

FOREIGN PATENT DOCUMENTS

EP 2348477 A1 7/2011

*Primary Examiner* — Ninos Donabed
(74) *Attorney, Agent, or Firm* — Chiesa Shahinian & Giantomasi PC

(57) ABSTRACT

A method and apparatus for providing an opportunistic crowd based service platform is disclosed. A mobile sensor device is identified based on a current location and/or other qualities, such as intrinsic properties, previous sensor data, or demographic data of an associated user of the mobile sensor device. Data is collected from the mobile sensor device. The data collected from the mobile sensor device is aggregated with data collected from other sensor devices, and content generated based on the aggregated data is delivered to a user device.

18 Claims, 6 Drawing Sheets

Related U.S. Application Data continuation of application No. 14/710,186, filed on May 12, 2015, now Pat. No. 9,578,095, which is a continuation of application No. 13/211,865, filed on Aug. 17, 2011, now Pat. No. 9,058,565.

(51) Int. Cl.

| | | |
|---|---|---|
| *H04N 7/18* | (2006.01) | |
| *H04N 21/4223* | (2011.01) | |
| *H04L 29/06* | (2006.01) | |
| *H04W 4/38* | (2018.01) | |
| *G06Q 10/00* | (2012.01) | |
| *G06Q 30/02* | (2012.01) | |
| *H04W 4/02* | (2018.01) | |

(52) U.S. Cl.
CPC ........ *H04L 29/06027* (2013.01); *H04L 67/14* (2013.01); *H04N 7/181* (2013.01); *H04N 7/185* (2013.01); *H04N 21/4223* (2013.01); *H04W 4/02* (2013.01); *H04W 4/38* (2018.02); *H04W 4/70* (2018.02)

(58) Field of Classification Search
CPC .... H04W 4/001; H04W 4/0006; H04L 63/07; H04L 43/00; H04L 67/02; H04L 2463/103; H04L 29/06027; H04L 63/10; H04L 65/4092; H04L 67/06; H04L 67/14; H04N 21/25841; H04N 7/147; G06Q 30/0261

See application file for complete search history.

(56) References Cited

U.S. PATENT DOCUMENTS

| | | |
|---|---|---|
| 8,175,297 B1 | 5/2012 | Ho et al. |
| 8,335,526 B2 | 12/2012 | Shankaranarayanan et al. |
| 8,350,758 B1 | 1/2013 | Parvizi et al. |
| 9,241,293 B2 | 1/2016 | Huang |
| 9,558,520 B2 | 1/2017 | Peak et al. |
| 9,807,183 B2 * | 10/2017 | Maguire ............... H04L 67/125 |
| 2002/0049728 A1 | 4/2002 | Kaku |
| 2002/0138842 A1 | 9/2002 | Chong et al. |
| 2005/0162523 A1 | 7/2005 | Darrell et al. |
| 2005/0254440 A1 | 11/2005 | Sorrell |
| 2006/0033809 A1 | 2/2006 | Farley |
| 2006/0053459 A1 | 3/2006 | Simerly et al. |
| 2006/0152592 A1 | 7/2006 | Chishima et al. |
| 2007/0153091 A1 | 7/2007 | Watlington et al. |
| 2007/0233368 A1 | 10/2007 | Friedmann |
| 2008/0037442 A1 | 2/2008 | Bill |
| 2008/0209486 A1 | 8/2008 | Casaos |
| 2008/0228733 A1 | 9/2008 | Davis et al. |
| 2008/0268876 A1 | 10/2008 | Gelfand et al. |
| 2009/0002515 A1 | 1/2009 | Strandwitz et al. |
| 2009/0219387 A1 | 9/2009 | Marman et al. |
| 2009/0251601 A1 | 10/2009 | Ihlefeld et al. |
| 2010/0009700 A1 | 1/2010 | Camp et al. |
| 2010/0020172 A1 | 1/2010 | Mariadoss |
| 2010/0198814 A1 | 8/2010 | Petersen et al. |
| 2010/0229229 A1 | 9/2010 | Kumar et al. |
| 2010/0250136 A1 | 9/2010 | Chen |
| 2011/0022550 A1 | 1/2011 | Pennacchiotti et al. |
| 2011/0022598 A1 | 1/2011 | Pennacchiotti et al. |
| 2011/0072034 A1 | 3/2011 | Sly et al. |
| 2011/0098029 A1 | 4/2011 | Rhoads et al. |
| 2011/0098056 A1 | 4/2011 | Rhoads et al. |
| 2011/0143776 A1 | 6/2011 | Shankaranarayanan et al. |
| 2011/0151898 A1 | 6/2011 | Chandra et al. |
| 2011/0161116 A1 * | 6/2011 | Peak ..................... G06Q 40/08 705/4 |
| 2011/0173214 A1 | 7/2011 | Karim |
| 2011/0191693 A1 | 8/2011 | Baggett et al. |
| 2011/0213628 A1 * | 9/2011 | Peak ..................... G06Q 40/08 705/4 |
| 2011/0283310 A1 | 11/2011 | Davis et al. |
| 2011/0286437 A1 | 11/2011 | Austin et al. |
| 2012/0021762 A1 | 1/2012 | Garin et al. |
| 2012/0028649 A1 | 2/2012 | Gupta et al. |
| 2012/0044354 A1 | 2/2012 | Cheng et al. |
| 2012/0089429 A1 * | 4/2012 | Geddes ............... G06Q 10/063 705/7.11 |
| 2012/0102164 A1 | 4/2012 | Gruen et al. |
| 2012/0102165 A1 | 4/2012 | Gruen et al. |
| 2012/0123806 A1 * | 5/2012 | Schumann, Jr. ....... G06Q 40/08 705/4 |
| 2012/0224743 A1 | 9/2012 | Rodriguez et al. |
| 2012/0291102 A1 | 11/2012 | Cohen |
| 2012/0300089 A1 | 11/2012 | Sbaiz et al. |
| 2013/0084882 A1 * | 4/2013 | Khorashadi ............. H04L 67/22 455/456.1 |
| 2013/0191246 A1 * | 7/2013 | Calman ............... G06Q 30/0639 705/26.9 |
| 2013/0191249 A1 * | 7/2013 | Schwartz ............... G06Q 30/02 705/26.61 |
| 2013/0254880 A1 * | 9/2013 | Alperovitch ........... G06F 21/51 726/22 |
| 2014/0289309 A1 * | 9/2014 | Mitchell, Jr. ......... H04L 65/605 709/203 |
| 2015/0073879 A1 * | 3/2015 | Acosta-Cazaubon ........................ G07C 13/00 705/12 |
| 2016/0027209 A1 * | 1/2016 | Demirli .................. G06F 3/015 345/419 |
| 2018/0152736 A1 * | 5/2018 | Alexander ....... H04N 21/21805 |

\* cited by examiner

OPPORTUNISTIC CROWD-BASED SERVICE PLATFORM

The present application is a continuation of U.S. application Ser. No. 15/403,682 filed Jan. 11, 2017, which is a continuation of U.S. patent application Ser. No. 14/710,186 filed May 12, 2015 and issued Feb. 21, 2017 as U.S. Pat. No. 9,578,095, which is a continuation of U.S. patent application Ser. No. 13/211,865 filed Aug. 17, 2011 and issued Jun. 16, 2015 as U.S. Pat. No. 9,058,565, the disclosures of which are herein incorporated by reference in its entirety.

BACKGROUND

The present disclosure relates generally to crowd based services and more particularly to a method and system for providing an opportunistic crowd based service platform.

Crowdsourcing is the act of outsourcing tasks, traditionally performed by an employee or contractor, to an undefined large group of people or a community, referred to as a crowd. Typical crowdsourcing tasks utilize an open call, which invites members of the public to carry out the task or portions of the task. In this form of distributed problem solving, various solutions are typically submitted by the crowd, and the crowd can also review the various solutions to find the best solutions. Crowdsourcing is increasing in use in a variety of fields as a relatively inexpensive way to find creative solutions to problems.

BRIEF SUMMARY

In recent years, mobile devices have been provided with increasing capabilities of capturing various types of information, such as pictures, video, audio, GPS data, etc. Embodiments of the present disclosure utilize mobile devices as a network of sensors to opportunistically collect information from multiple locations and process the information to provide a service to users. The present disclosure generally provides a method and system for providing an opportunistic crowd based service platform.

In one embodiment a mobile sensor device is selected based on its current location. Data is collected from the mobile sensor device, and the data may be aggregated with data collected from other sensor devices. Content can then be generated based on the aggregated data and delivered to a user device.

These and other advantages of the disclosure will be apparent to those of ordinary skill in the art by reference to the following detailed description and the accompanying drawings.

DETAILED DESCRIPTION

The present disclosure generally provides a method and system for providing an opportunistic crowd based service platform. Embodiments of the present disclosure utilize mobile devices as a network of sensors to opportunistically collect information from multiple locations. The opportunistic crowd based service platform selects mobile devices to capture data opportunistically, in that the devices are selected based on their current locations in order to target desired data. The opportunistic crowd based service platform aggregates and processes the information to generate content, and provides the content generated from the collected data to users.

Figure 1:
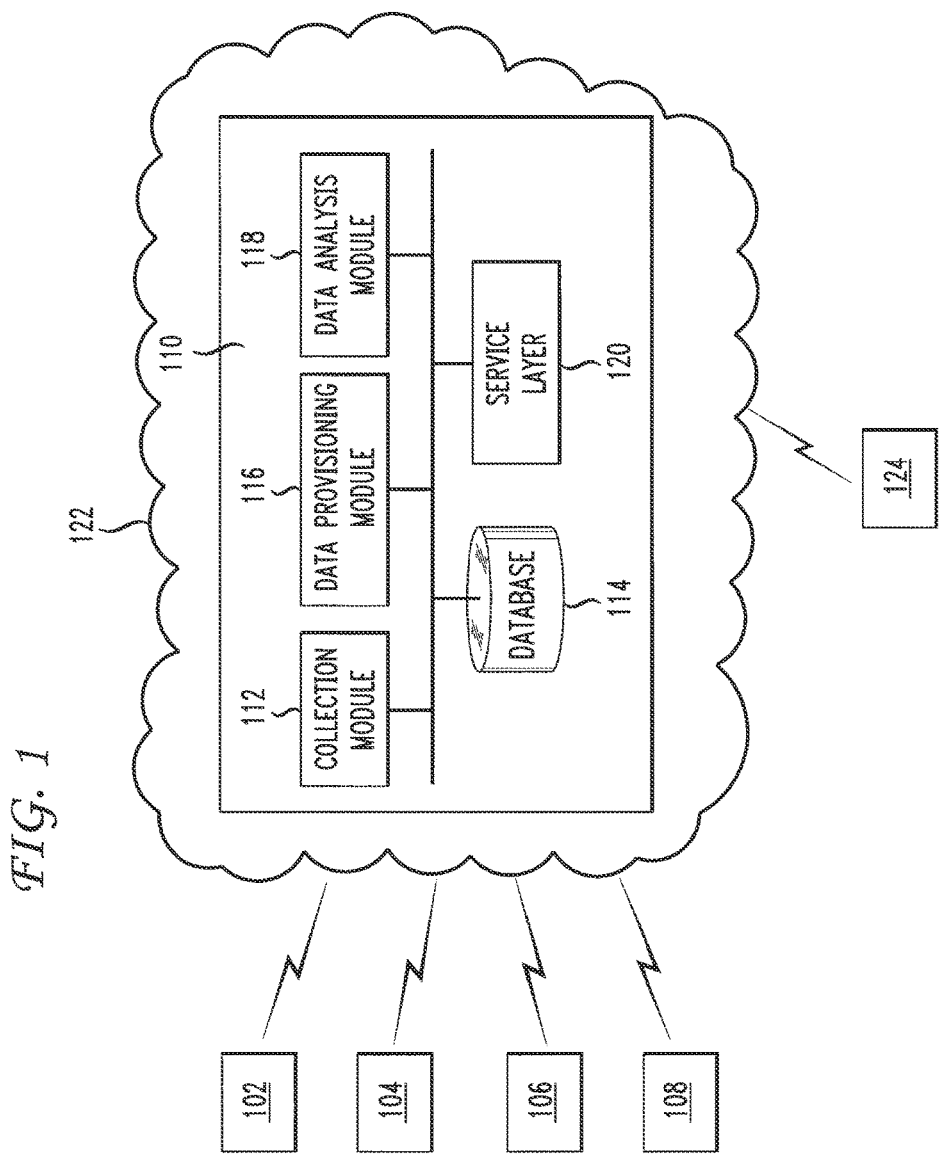
FIG. 1 illustrates an opportunistic crowd based service platform according to an embodiment of the present disclosure.

FIG. 1 illustrates an opportunistic crowd based service platform according to an embodiment of the present disclosure. As illustrated in FIG. 1, an opportunistic crowd based service platform 110 can communicate with various sensor devices 102, 104, 106, and 108 over a network 122. The network 122 may be the Internet, a cellular network (e.g., a 3G or 4G network), or any other type of data network. The opportunistic crowd based service platform 110 can also communicate with a user device 124 over the network 122.

The sensor devices 102, 104, 106, and 108 can be any device capable of digitally capturing a real-world observation at a specific time and sending information to the network 122. The sensor devices 102, 104, 106, and 108 send data reflecting measurements or observations to the opportunistic crowd based service platform 110 over the network 122. The sensor devices 102, 104, 106, and 108 can be capable of capturing a real-world observation without any input from a user. It is also possible that the sensor devices 102, 104, 106, and 108 may be capable of receiving a real-world observation input from a user and transmitting digital data representing the real-world observation to the network 122. According to an advantageous embodiment, one or more of the sensor devices 102, 104, 106, and 108 are mobile sensor devices. Mobile sensor devices are personal communication devices, such as cellular telephones, tablet devices, personal digital assistants (PDAs), cameras with network connectivity, etc., that may be carried with a user and include functionality to capture real-world observations and connect to the network 122. Data captured may include, but is not limited to, picture data, video data, audio data, global positioning system (GPS) data, signal strength, light sensor data, temperature data, pollution data (e.g., data from an air quality sensor), calibration data that can be used to calibrate the sensors, and data requiring higher levels of intelligence and interpretation that may require involving a user of the device. Another type of mobile sensor may be a drone that moves independently of a user and is controlled remotely. In addition to mobile sensor devices, the sensor devices 102, 104, 106, and 108 may also include fixed location devices, such as fixed locations cameras, and distributed radio frequency identification (RFID) sensor devices. The sensor devices 102, 104, 106, and 108 can also send additional information, such as time and date information, and age, sex, and demographic information associated with users of the sensor devices 102, 104, 106, and 108. This information may also be retrieved from a database that stores information associated with users of mobile sensor devices.

Each of the sensors 102, 104, 106, and 108 themselves, can also be a hierarchy of one or more sensors like position devices (GPS, accelerometers, gyroscopes) and, audio/visual devices such as video and picture cameras and microphones. Such sensors may be 'smart' in the sense that they have pre-processing capabilities as well as aggregation capabilities. In one example, captured video data has an association of the position and the temporal evolution of the motion information of the person capturing the data such that not only is the video data available, but motion and position data of the sensor capturing the video is also available. This capability is particularly useful in the aggregation and reconstruction of "first-person" video data.

The opportunistic crowd based service platform 110 includes a collection module 112, database 114, data provisioning module 116, data analysis module 118, and service layer 120. The opportunistic crowd based service platform 110 and the various components 112, 114, 116, 118, and 120 may be implemented on a computer or distributed over multiple networked computers.

The collection module 112 of the opportunistic crowd based service platform 110 identifies the sensor devices 102, 104, 106, and 108 and collects data from the sensor devices 102, 104, 106, and 108. In particular, in order to collect targeted sensor data, the collection module 112 can select one or more mobile sensor devices 102, 104, 106, and 108 that can provide the targeted sensor data based on current locations of the mobile sensor devices 102, 104, 106, and 108 and technical capabilities of the mobile sensor devices. This allows the mobile sensor devices 102, 104, 106, and 108 to assume the role of sensors in an opportunistic way. That is, based on their current locations, mobile devices that are typically carried with users to various locations and primarily used for other purposes (e.g., a cellular telephone of a user) can be opportunistically utilized as a sensor network covering a targeted area. This allows the opportunistic crowd based service platform 110 to efficiently obtain data from different locations where fixed sensors may not be located without using expensive resources. For example, the opportunistic crowd based service platform 110 could collect videos and/or images from various locations where breaking news is occurring by identifying and selecting mobile devices at the locations and receiving the videos and/or images from the mobile devices.

In one embodiment, the collection module 112 identifies one or more mobile sensor devices that are capable of capturing targeted sensor data based on the current locations of the mobile sensor device and the capabilities of the mobile sensor devices. The capabilities of sensor devices registered with the opportunistic crowd based service platform 110 may be stored in the database 114. The identification of the mobile sensor devices by the collection module 112 may be in response to a determination that the targeted sensor data is necessary by the data analysis module 118. The collection module 112 may send requests to the identified mobile sensor devices for the targeted sensor data. For example, the collection module can send a message to a targeted mobile sensor device using a messaging protocol (e.g., SMS or MMS), and the message can include a link that can be selected by a user of the mobile sensor device to join opportunistic sensor network for a period of time and send data to the opportunistic crowd based service platform 110. At this point, in one possible implementation, the user can control the mobile sensor device to capture the requested data (e.g., take pictures, video, or manually enter an observation). In another possible implementation, the collection module 112 can communicate directly with the mobile sensor device to retrieve the targeted sensor data (e.g., temperature data, air quality data, light sensor data, signal strength data, etc.). In yet another possible implementation, upon joining the opportunistic sensor network, a mobile sensor device can be controlled remotely by the collection module 112 to capture the targeted data. For example, a remote user can control another user's mobile device for a period of time through the opportunistic crowd based service platform 110 to control video capture at the location of the mobile device. The collection module 112 can also control software to run on mobile sensor devices and send updates and/or metadata to the mobile sensor devices. In order to encourage users to join an opportunistic sensor network, it is possible that participation could be incentivized by paying or somehow rewarding users who opt in to the opportunistic sensor network. If no mobile sensor device is detected at a specific target location, the collection module 112 can identify a mobile sensor device that is capable of capturing the targeted sensor data at a location near the target location and request that the mobile sensor device be moved to the target location to capture the targeted sensor data.

In an advantageous implementation, the collection module 112 may select a mobile sensor device and automatically control that mobile sensor device to act an access point that allows other mobile sensor devices to connect to the network 122. This is described in greater detail below with reference to FIG. 2.

In another embodiment, the collection module 112 can passively collect data that is streamed or periodically sent from sensor devices 102, 104, 106, and 108 that have registered with the opportunistic crowd based service platform 110. This data can be stored at the database 114 and selected for aggregation based on a location of the sensor device that captured the data and the time at which the data was captured.

The collection module 112 collects data from fixed location sensor devices in a similar fashion as described above in connection with mobile sensor devices. In the case of fixed location sensor devices, the locations of the devices may be stored in the database 114. It is possible that fixed location sensor devices remain in an inactive or powered down state until sensor data is needed from the fixed location sensor devices. In this case, the collection module 112 can control the fixed location sensor devices to switch to an active state and collect the data from the active fixed location sensor devices. The collection module can also collect data and store it locally and only transfer the data, or portion of the data, that meets certain criteria as specified by the data analysis module 118, to the data analysis module 118 when such a request is received.

The database 114 may be implemented as a single central database or as multiple distributed databases. The database 114 stores the data collected from the sensor devices 102, 104, 106, and 108 by the collection module 112. The database may store identification information for sensor devices 102, 104, 106, and 108 registered with the opportunistic crowd based service platform 110. The database 114 may also store information related to the sensor devices 102, 104, 106, and 108 and/or users of the sensor devices 102, 104, 106, and 108. For example, the database may store a list of sensor capabilities for each device, as well as user information (e.g., age, sex, demographic information, etc.) for the user of each device. The database 114 may store locations of fixed sensor devices. In addition to the database 114 in the opportunistic crowd based service platform 110, data may also be collected from other local databases via the network 122.

The data provisioning module 116 selects which of the data collected from the sensor devices 102, 104, 106, and 108 is used. The data provisioning module 116 may redact redundant or low-quality data. The data provisioning module 116 may check the quality of the data to ensure that the best data is selected. For example, the data provisioning module 116 may utilize image or video processing algorithms to check received images for noise, blurring, or other image/video characteristics. The data provisioning module 116 may also determine quality of the image or video with respect to a target or objective of the image or video. For example, the image quality can be determined based on the positioning of the mobile sensor device, whether the view in the image or video is obstructed, etc. The data provisioning module 116 can also compare the collected data to similar data from other sources to determine whether the data is credible and/or consistent among multiple sensors and to determine which sensor captured the best quality data. The data provisioning module 116 can drop data that is determined to be low quality or not credible. The data provisioning module 116 can also rate various sensor devices based on the quality data collected from the sensor devices. The ratings for various sensor devices can be stored in the database 114 and adjusted by the data provisioning module 116 whenever new data is collected from the sensor devices. The collection module 112 can then utilize the ratings of the sensor devices when selecting which sensor devices to use to collect data. The data provisioning module 116 can also control how private or sensitive collected data is used by the opportunistic crowd based service platform 110. In one embodiment, encryption and digital rights management (DRM) like methods are applied to the data to further restrict unauthorized use of the data.

The data analysis module 118 automatically aggregates the collected data and analyzes the data to generate content based on the aggregated data. In particular, the data analysis module 118 combines the data collected from multiple sources and synthesizes the data into a useful result that can be delivered to a user or customer. The result of aggregating and synthesizing the collected data is referred to herein as "content". The data can be processed to generate content that is specific for a particular customer or may be processed to generate global content that can be delivered to users that subscribe to a service. The data analysis module 118 can utilize various data processing applications in order to process the data and generate finished content from the collected data. For example, a photostitch application can be used to generate new images (e.g., 3D images, or panoramic images) by combining images collected from various mobile sensor devices. Video splicing can be used to combine videos received from various mobile sensor devices into a single video stream that enhances the quality and/or extends the duration of the clip. Audio processing can be used to combine audio data from various devices in order to generate a stereo or super-stereo audio stream. Other multimedia processing may be used to combine various types of data (e.g., image, video, audio) received from various mobile sensor devices.

Other types of applications may be used for time, frequency, or category analysis of the collected data. A time analysis of the data may allow the system to automatically accept or reject spurious data from the same time/space location (like the disagreement of one temperature reading versus ten others collected in the same location). A frequency or category analysis looks for patterns like the temporal evolution of the data and its frequency in relation to the type of data itself. For example, if the collection module 112 was attempting to capture positional sensor data for a person driving a car, but the temporal evolution of that data indicated speeds of walking or air plane flight, the analysis module 118 could detect this deviation.

Various mathematical algorithms may be used to combine various types of data in order to generate high level content from the data.

When analyzing the collected data to generate the content, the data analysis module 118 may detect gaps in the data. For example, air quality measurements may be detected throughout a city. The air quality measurements can be analyzed by the data analysis module 118 to generate a pollution report for the city. The data analysis module 118 can determine that there are regions in the city for which the air quality is not detected. In one possible implementation, the data analysis module 118 can interpolate the missing data based on the collected data. In another possible implementation, the data analysis module 118 can alert the collection module 112 that air quality measurements are needed at specific locations. This creates a feedback loop in which the collection module 112 identifies a sensor device capable of capturing the missing data and collects the missing data from the identified sensor device. If no sensor device is located at the specific location, the collection module 112 can then request that a mobile sensor device near the specific location move to the specific location to capture the missing data.

The content generated by the data analysis module 118 can be in the form of reports, such as pie charts, clusters, tag clouds, statistical reports, geographical maps colored by activity, etc. Such reports can be customized based on a context of the end user receiving delivery of the reports. The content can also be in the form of multimedia content, such as an audio stream, a video stream, or reconstructed or synthesized images, such a reconstructed 3D image or a "zoomed in view". Content may also take simpler forms, such as streams of metadata (i.e., statistical information with numerical values) that correspond to time-synchronized event data provided by aggregated sensor data.

The service layer 120 of the opportunistic crowd based service platform 110 communicates with a user device 124 of an end user or customer over the network 122. It can be noted that the user device 124, may be, but does not have to be, used as a mobile sensor device. The user device may be a mobile device, or any other device capable of connecting to the network 122, such as a computer, set top box, television, appliance, etc. The service layer allows a user to request specific content. In response to a request for content received by the service layer 120, the data analysis module 118 can determine what data is necessary to generate that content, and alert the collection module 112 to collect the targeted data. The service layer 120 delivers the content generated by the data analysis module 118 to the user device 124. The service layer 120 can also deliver content that was not specifically requested by the user to the user device. The service layer 120 can use various techniques for delivering the content. For example, the service layer 120 can deliver the content using various messaging protocols, including email, SMS, MMS, etc. or other protocols such as HTTP. The service layer 120 can also stream audio and/or video to the user device 124 over the network 122. In addition to delivering the content to the user device 120, the service layer can also deliver additional information related to the content to the user device 124 based on the context, such as location, activities, demographics, etc. associated with the user device 124. The service layer 120 may also smartly select a subset of content to be delivered based on bandwidth and/or power constraints. For example, instead of providing a video stream, the service layer 120 can deliver a sequence of sample images based on the content, such that only new content is sent. Further, the service layer may be used in an interactive form such that the user device 124 is given content from the analysis module 118 and then the collection module 112 requests a secondary sensor data collection from the user directly. Further, requests to the service layer 120 can be made directly from the user device 124 in an interactive fashion. The user device can be the driver and request information dynamically. For example, after receiving high quality data from a specific sensor device, the user device 124 may request additional data from that sensor device directly or via the collection module 112. Or the user device 124 may send instructions only to that sensor device (for example, to move to another location and to collect a certain type of data).

Figure 2:
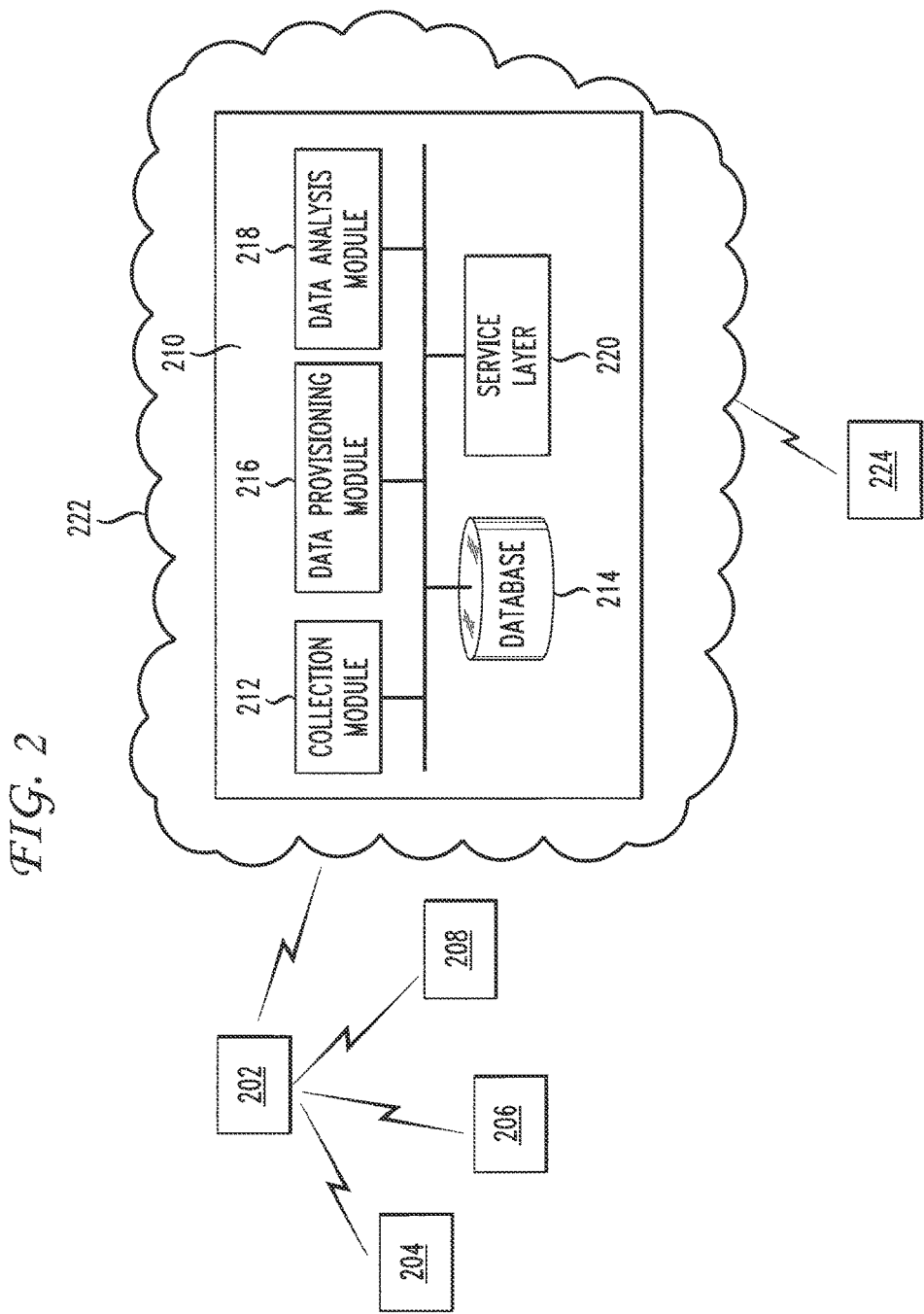
FIG. 2 illustrates an opportunistic crowd based service platform in which a mobile sensor device is set as a dedicated access point according to an embodiment of the present disclosure.

FIG. 2 illustrates an opportunistic crowd based service platform in which a mobile sensor device is set as a dedicated access point according to an embodiment of the present disclosure. The opportunistic crowd based service platform 210, collection module 212, database 214, data provisioning module 216, data analysis module 218, service layer 220, sensor devices 202, 204, 206, and 208, network 222, and user device 224 of FIG. 2 operate in a similar fashion to the opportunistic crowd based service platform 110, collection module 112, database 114, data provisioning module 116, data analysis module 118, service layer 120, sensor devices 102, 104, 106, and 108, network 122, and user device 124 of FIG. 1, except as described below. For the purposes of discussing FIG. 2, all of the sensor devices 202, 204, 206, and 208 are considered to be mobile sensor devices, although the present disclosure is not limited thereto. As illustrated in FIG. 2, mobile sensor devices 202, 204, 206, 208 are identified by the collection module 212 of the opportunistic crowd based service platform 210, and the collection module sends requests to the mobile sensor devices 202, 204, 206, and 208. In response to mobile sensor device 202 opting in to the opportunistic sensor network (i.e., agreeing to capture data and send the data to the opportunistic crowd based service platform 210), the collection module 212 automatically sets mobile sensor device 202 as a dedicated access point for the opportunistic sensor network for a set period of time. Mobile sensor device 202 then serves as a dedicated access point through which other mobile sensor devices connect to the network 222. In response to mobile sensor devices 204, 206, 208 opting in to the opportunistic sensor network, mobile sensor devices 204, 206, and 208 are controlled to connect to the network 222 through mobile sensor device 202, which is serving as the dedicated access point. The use of mobile device 202 as a dedicated access point for the opportunistic sensor network allows the opportunistic crowd based service platform 210 to dedicate network resources to network traffic entering the network 222 through the dedicated access point, and thus prioritize data being collected through the opportunistic sensor network.

Figure 3:
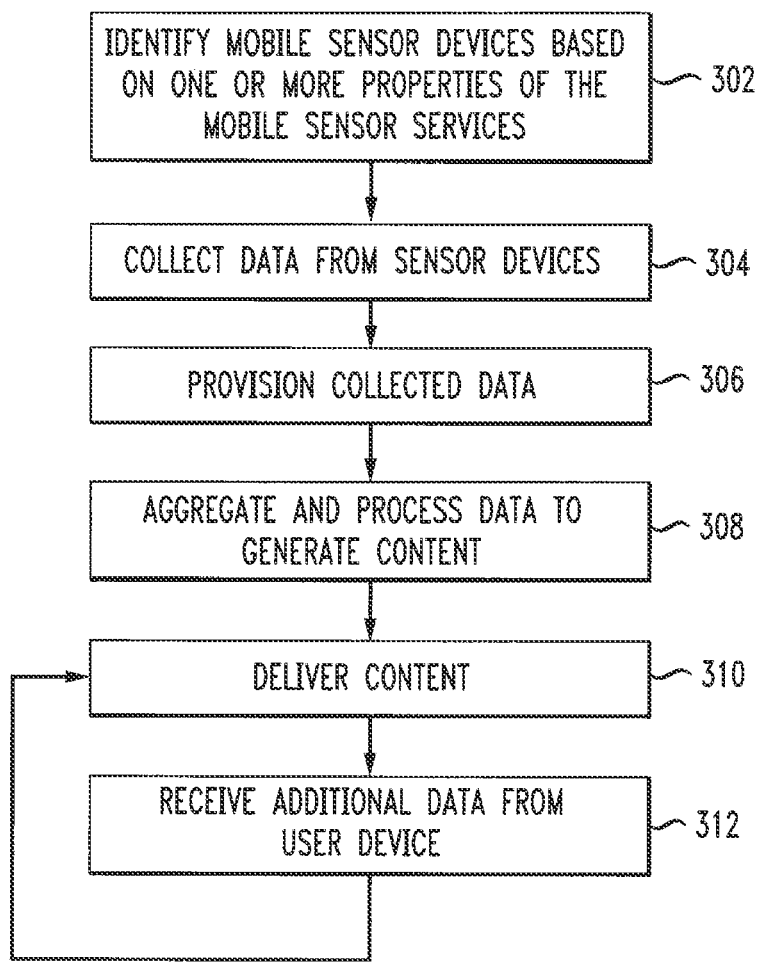
FIG. 3 illustrates a method of delivering opportunistic crowd based service according to an embodiment of the present disclosure.

FIG. 3 illustrates a method of delivering opportunistic crowd based service according to an embodiment of the present disclosure. As illustrated in FIG. 3, at 302, mobile sensor devices are selected based on one or more properties of the mobile sensor devices, such as current locations of the mobile sensor devices, data that is currently (or last available) from the sensors, intrinsic properties or qualities of those sensors, or even demographic and user-based information that correspond to the sensors. In particular, mobile sensor devices at or near a targeted location that are capable of capturing a specific type of data are identified.

At 304, data is collected from the selected mobile sensor devices. In one embodiment, a request is sent to the selected mobile sensor devices for a specified type of data. For example, data, such as image data, video data, audio data, temperature data, light sensor data, air quality data, etc., can be requested from a mobile sensor device. The request can provide a mechanism (e.g., a link) that allows the user of the mobile sensor device to agree to provide the requested data. In response to the request, the data is captured by the mobile sensor devices and received by the opportunistic crowd based service platform. Accordingly, the mobile sensor devices for an opportunistic sensor network provide sensor data covering various locations.

At 306, the collected data is provisioned. In particular, the data can be provisioned to remove low quality data, redundant data, or data that is determined to be not credible.

At 308, the collected data is aggregated and processed to generate content from the data. The data collected from multiple mobile sensor devices can be combined, and this data can also be combined with data collected from fixed location sensor devices. The data can be processed using various applications to generate meaningful and/or visually appealing content. For example, multiple images received from mobile sensor devices at different locations can be combined and processed using a photostitch algorithm to generate a reconstructed 3D image or a panoramic image. Multiple types of data may be combined in a composite presentation. For example, images from a single or multiple cameras and the temperature data in an interpolated form can be used to generate an image that displays the temperature at each location by positioning a pointing device (e.g., a mouse) on a point in the image. Various types of data can be processed to organize the data and present the data in reports. Further, other data not collected from the multiple mobile sensors can be combined with the data collected from the multiple mobile sensors.

At 310, the content is delivered to a user device. The content may be delivered to the user device in response to a query or request. For example, the content may be generated and delivered in response to a request for specific content, such as a user requesting a map of pollution versus location for a specific city. The content may also be generated and delivered in response to a more general query or question. For example, a user may send a general query to the opportunistic crowd based service platform, which then determines which sensor data is necessary to answer the question and determines what type of content should be used to best present a response to the query. The user may also subscribe to a service and passively receive content generated for the service. For example, a sports fan may subscribe to a service that provides video instant replays at various angles of a live sporting event. In this case, videos taken using mobile sensor devices at different locations at the event can be combined to show instant replays at different angles, which can be streamed to a user device.

At 312, additional data can be received from the user device. In particular, sensors of the user device can be requested by the collection module 212 to record an additional set of data based on the user's interaction with the delivered content 310. While this step is not required in all embodiments, one embodiment of this disclosure could utilize this additional sensor data to create an interactive service. For instance, in the example described above in which users receive video instant replays of a sporting event, users of different mobile devices can rate the instant replays and the analysis module 118 and service layer 120 can adjust the delivered content according to user preferences.

Figure 4:
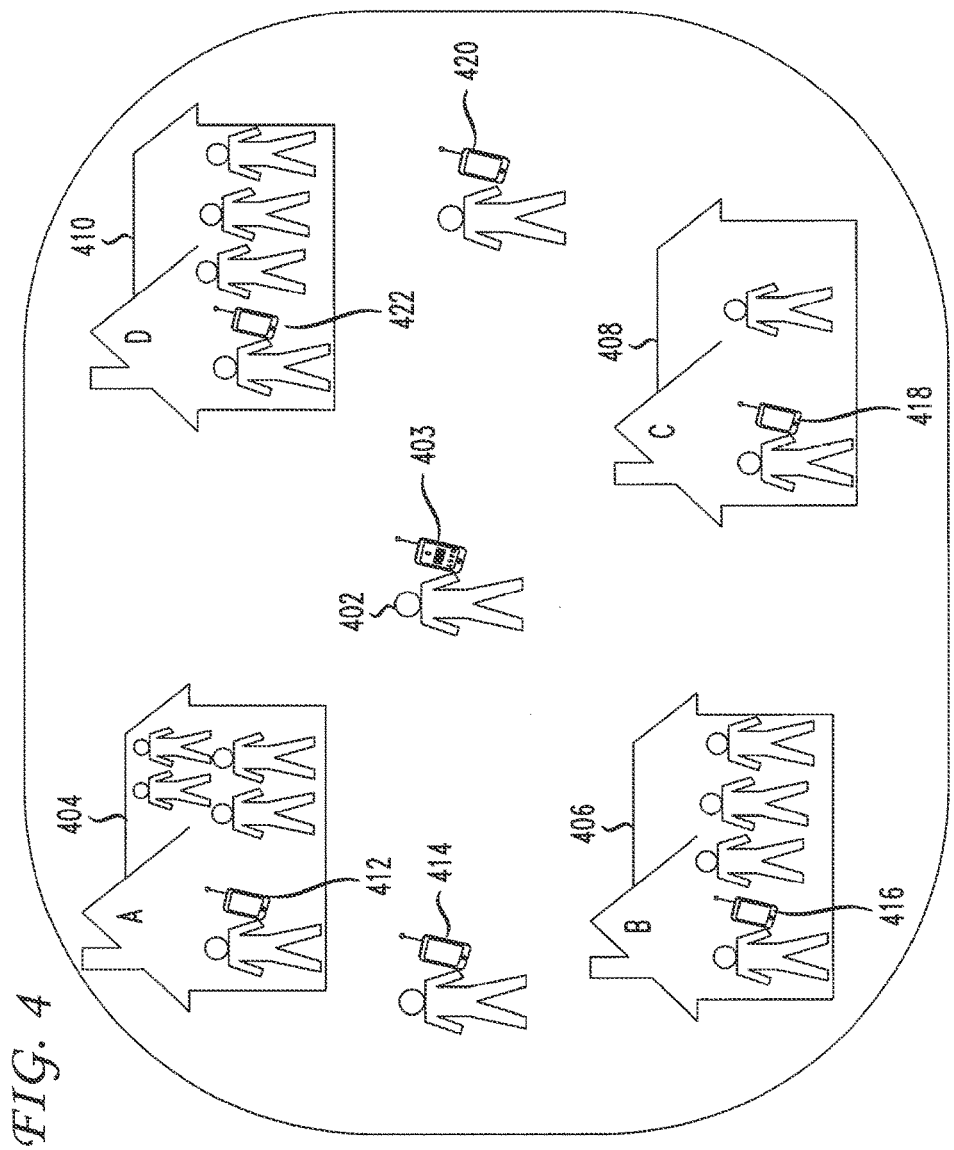
FIG. 4 illustrates a first example of opportunistic crowd based service provided using an embodiment of the present disclosure.

FIG. 4 illustrates a first example of opportunistic crowd based service provided using an embodiment of the present disclosure. In the example of FIG. 4, the opportunistic crowd based service platform (not shown) is used to inform a user which coffee shop in a certain radius of the user's present location is currently least crowded. As illustrated in FIG. 4, coffee shops A (404), B (406), C (408), and D (410) are within a certain radius of user 402. Mobile sensor devices 412, 414, 416, 418, 420, and 422 are registered with the opportunistic crowd based service platform. In response to a query from the mobile device 403 of user 402, the opportunistic crowd based service platform identifies mobile sensor devices 412, 416, 418, and 422 as being at coffee shops A (404), B (406), C (408), and D (410), respectively. A request can be sent to each of mobile sensor devices 412, 416, 418, and 422 for the user of each device to enter the approximate number of people at the respective coffee shop. Alternatively, instead of the user of each device 412, 416, 418, and 422 entering a number of people, a microphone in each device 412, 416, 418, and 422 can be activated for a short time period in order to detect a decibel level of ambient noise in each coffee shop A (404), B (406), C (408), and D (410). The opportunistic crowd based service platform can then estimate the relative size of the crowd at each coffee shop A (404), B (406), C (408), and D (410) based on the ambient noise levels. Based on the data collected from the mobile sensor devices 412, 416, 418, and 422, the opportunistic crowd based service platform generates a report that answers the query as to which coffee shop is least crowded and visualizes the relative number of people in each of the coffee shops A (404), B (406), C (408), and D (410), and delivers the report to the mobile device 403 of user 402.

Figure 5:
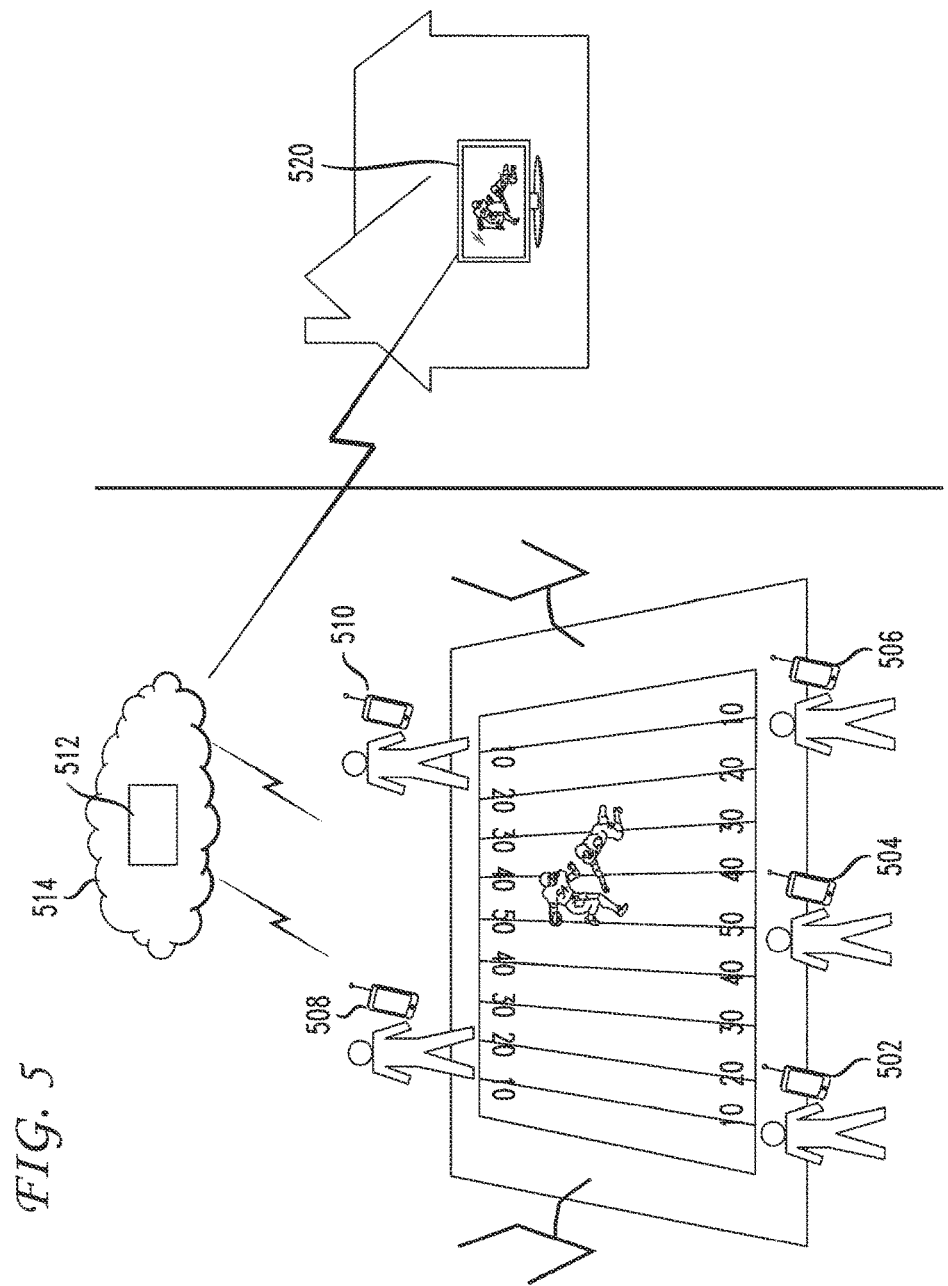
FIG. 5 illustrates a second example of opportunistic crowd based service provided using an embodiment of the present disclosure.

FIG. 5 illustrates a second example of opportunistic crowd based service provided using an embodiment of the present disclosure. In the example of FIG. 5, the opportunistic crowd based service platform 512 identifies mobile sensor devices 502, 504, 506, 508, and 510 capable of capturing pictures and/or video at strategic locations in a football stadium. For example, the mobile sensor devices 502, 504, 506, 508, and 510 may be smart phones with camera and/or video camera functionality that belong to fans seated at various locations in the stands. The opportunistic crowd based service platform 512 receives images and/or video of the football game captured by the mobile sensor devices 502, 504, 506, 508, and 510 over a network 514. The opportunistic crowd based service platform 512 can combine the images and/or video received from the mobile sensor devices 502, 504, 506, 508, and 510 to generate content. The images and/or video received from the mobile sensor devices 502, 504, 506, 508, and 510 may also be combined with images and video captured using fixed cameras (not shown) throughout the stadium. The opportunistic crowd based service platform 512 can generate content such as reconstructed 3D images or "zoomed in" images from different vantage points. The opportunistic crowd based service platform 512 can also generate content such as video highlights that combine the videos from different viewing angles. This content can be delivered to a user device 520, such as a television, set top box, appliance, or computer in the home of a user. For example, images and/or video generated by the opportunistic crowd based service platform 512 using the images and/or video collected from the mobile sensors mobile sensor devices 502, 504, 506, 508, and 510 may be streamed to the user device 520. The user device 520 may passively receive and display the content, or may actively request various views or images, which can then be generated and delivered by the opportunistic crowd based service platform 512.

Figure 6:
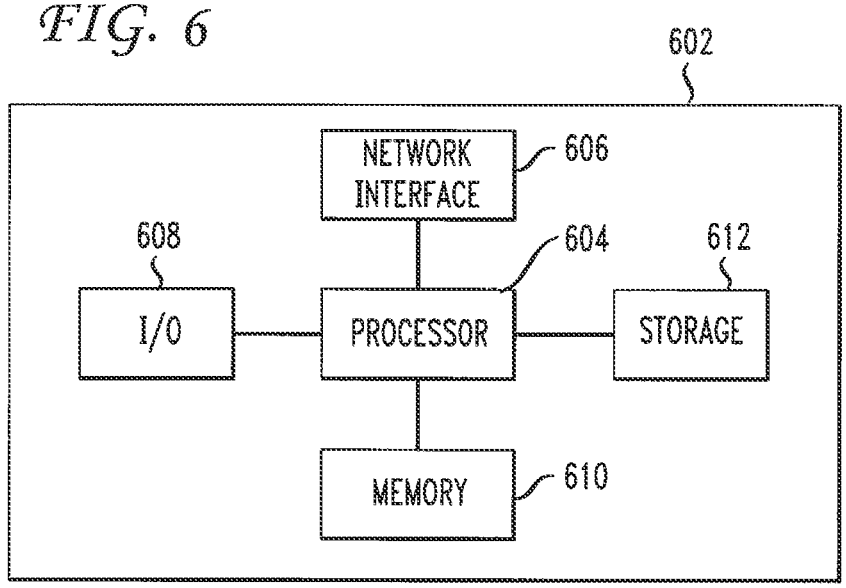
FIG. 6 is a high level block diagram of a computer.

The above described opportunistic crowd based service platform and the above-described methods for delivering opportunistic crowd based service may be implemented on a computer using well-known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612, or other computer readable medium, (e.g., magnetic disk) and loaded into memory 610 when execution of the computer program instructions is desired. Thus, the operations described above, including the method steps illustrated in FIG. 3 and the operations of the various components of the opportunistic crowd based service platform, may be defined by the computer program instructions stored in the memory 610 and/or storage 612 and controlled by the processor 604 executing the computer program instructions. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the general inventive concept disclosed herein is not to be determined from the Detailed Description, but rather from the claims as interpreted according to the full breadth permitted by the patent laws. It is to be understood that the embodiments shown and described herein are only illustrative of the principles of the present general inventive concept and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A method, comprising
selecting, by a service platform including a processor, a first mobile sensor device for providing first data based on a current location of the first mobile sensor device by identifying at least one mobile sensor device located at a target location that is capable of capturing a specific type of the first data and selecting one of the at least one mobile sensor device located at the target location that is capable of capturing the specific type of the first data as the first mobile sensor device for providing the first data;
selecting, by the service platform, a second mobile sensor device to act as a dedicated wireless access point based on a current location of the second mobile sensor device and capabilities of the second mobile sensor device;
controlling, by the service platform, the second mobile sensor device to act as the dedicated wireless access point that allows the first mobile sensor device to connect to a network, wherein the first mobile sensor device and the second mobile sensor device are independent mobile sensor devices associated with different respective users;

obtaining, by the service platform, the first data from the first mobile sensor device via the network;

aggregating, by the service platform, the first data collected from the first mobile sensor device with second data collected from one or more other mobile sensor devices to generate aggregated data; and delivering, by the service platform, content to a recipient device based on the aggregated data, wherein the first data collected from the first mobile sensor device comprises first image data, the second data collected from the one or more other mobile sensor devices comprises second image data, and wherein the aggregating the first data collected from the first mobile sensor device with the second data collected from the one or more other mobile sensor devices comprises:

generating a reconstructed image using the first and second image data collected from the first mobile sensor device and the one or more other mobile sensor devices.

2. The method of claim 1, wherein the obtaining the first data from the first mobile sensor device comprises:

sending a request to the first mobile sensor device to capture the first data; and receiving the first data from the first mobile sensor device via the network in response to the request.

3. The method of claim 1, wherein the selecting the first mobile sensor device for providing the first data further comprises:

selecting the first mobile sensor device based on one of an intrinsic property of the first mobile sensor device, a previous reading received from the first mobile sensor device, or demographic information of a user of the first mobile sensor device.

4. The method of claim 1, further comprising:

removing data determined to be low quality from the first data collected from the first mobile sensor device and the second data collected from the one or more other mobile sensor devices.

5. The method of claim 1, further comprising:

detecting gaps in the aggregated data;

determining a second target location to capture third data based on the gaps detected in the aggregated data; and identifying a third mobile sensor device currently located at the second target location.

6. The method of claim 1, further comprising:

detecting gaps in the aggregated data;

determining a second target location to capture third data based on the gaps detected in the aggregated data;

identifying a third mobile sensor device not currently located at the second target location that is capable of capturing the third data; and requesting that the third mobile sensor device not currently located at the second target location be moved to the second target location.

7. The method of claim 1, further comprising:

controlling, by the service platform, the second mobile sensor device to act as the dedicated wireless access point that allows the one or more other mobile sensor devices to connect to the network.

8. The method of claim 7, further comprising:

dedicating network resources to network traffic entering the network through the dedicated wireless access point to prioritize the first data collected from the first mobile sensor device and the second data collected from the one or more other mobile sensor devices.

9. An opportunistic crowd based service platform apparatus, comprising:

a processor; and a memory to store computer program instructions, the computer program instructions when executed on the processor cause the processor to perform operations comprising:

selecting a first mobile sensor device for providing first data based on a current location of the first mobile sensor device by identifying at least one mobile sensor device located at a target location that is capable of capturing a specific type of the first data and selecting one of the at least one mobile sensor device located at the target location that is capable of capturing the specific type of the first data as the first mobile sensor device for providing the first data;

selecting a second mobile sensor device to act as a dedicated wireless access point based on a current location of the second mobile sensor device and capabilities of the second mobile sensor device;

controlling, by the service platform, the second mobile sensor device to act as the dedicated wireless access point that allows the first mobile sensor device to connect to a network, wherein the first mobile sensor device and the second mobile sensor device are independent mobile sensor devices associated with different respective users;

obtaining, by the service platform, the first data from the first mobile sensor device via the network;

aggregating, by the service platform, the first data collected from the first mobile sensor device with second data collected from one or more other mobile sensor devices to generate aggregated data; and delivering, by the service platform, content to a recipient device based on the aggregated data, wherein the first data collected from the first mobile sensor device comprises first image data, the second data collected from the one or more other mobile sensor devices comprises second image data, and wherein the aggregating the first data collected from the first mobile sensor device with the second data collected from the one or more other mobile sensor devices comprises:

generating a reconstructed image using the first and second image data collected from the first mobile sensor device and the one or more other mobile sensor devices.

10. The opportunistic crowd based service platform apparatus of claim 9, wherein the operations further comprise:

removing data determined to be low quality from the first data collected from the first mobile sensor device and the second data collected from the one or more other mobile sensor devices.

11. The opportunistic crowd based service platform apparatus of claim 9, wherein the operations further comprise:

detecting gaps in the aggregated data;

determining a second target location to capture third data based on the gaps detected in the aggregated data; and identifying a third mobile sensor device for capturing the third data based on a current location of the third mobile sensor device relative to the second target location.

12. The opportunistic crowd based service platform apparatus of claim 9, wherein the operations further comprise:

controlling the second mobile sensor device to act as the dedicated wireless access point that allows the one or more other mobile sensor devices to connect to the network.

13. The opportunistic crowd based service platform apparatus of claim 12, wherein the operations further comprise:
dedicating network resources to network traffic entering the network through the dedicated wireless access point to prioritize the first data collected from the first mobile sensor device and the second data collected from the one or more other mobile sensor devices.

14. A non-transitory computer readable medium storing computer executable instructions for controlling a service platform to deliver opportunistic crowd based service, the computer program instructions when executed on a processor, cause the processor to perform operations comprising:
selecting, by the service platform, a first mobile sensor device for providing first data based on a current location of the first mobile sensor device by identifying at least one mobile sensor device located at a target location that is capable of capturing a specific type of the first data and selecting one of the at least one mobile sensor device located at the target location that is capable of capturing the specific type of the first data as the first mobile sensor device for providing the first data;
selecting, by the service platform, a second mobile sensor device to act as a dedicated wireless access point based on a current location of the second mobile sensor device and capabilities of the second mobile sensor device;
controlling, by the service platform, the second mobile sensor device to act as the dedicated wireless access point that allows the first mobile sensor device to connect to a network, wherein the first mobile sensor device and the second mobile sensor device are independent mobile sensor devices associated with different respective users;
obtaining, by the service platform, the first data from the first mobile sensor device via the network;
aggregating, by the service platform, the first data collected from the first mobile sensor device with second data collected from one or more other mobile sensor devices to generate aggregated data; and
delivering, by the service platform, content to a recipient device based on the aggregated data,
wherein the first data collected from the first mobile sensor device comprises first image data, the second data collected from the one or more other mobile sensor devices comprises second image data, and wherein the aggregating the first data collected from the first mobile sensor device with the second data collected from the one or more other mobile sensor devices comprises:
generating a reconstructed image using the first and second image data collected from the first mobile sensor device and the one or more other mobile sensor devices.

15. The non-transitory computer readable medium of claim 14, wherein the operations further comprise:
removing data determined to be low quality from the first data collected from the first mobile sensor device and the second data collected from the one or more other mobile sensor devices.

16. The non-transitory computer readable medium of claim 14, wherein the operations further comprise:
detecting gaps in the aggregated data;
determining a second target location to capture third data based on the gaps detected in the aggregated data; and
identifying a third mobile sensor device for capturing the third data based on a current location of the third mobile sensor device relative to the second target location.

17. The non-transitory computer readable medium of claim 14, wherein the operations further comprise:
controlling, by the service platform, the second mobile sensor device to act as the dedicated wireless access point that allows the one or more other mobile sensor devices to connect to the network.

18. The non-transitory computer readable medium of claim 17, wherein the operations further comprise:
dedicating network resources to network traffic entering the network through the dedicated wireless access point to prioritize the first data collected from the first mobile sensor device and the second data collected from the one or more other mobile sensor devices.

* * * * *